Jan. 15, 1957  W. L. STAFFORD ET AL  2,777,667
PORTABLE TRUCK DUMP
Filed April 8, 1954

Walter L. Stafford
Eugene T. White, Jr.
INVENTORS,

BY Clarence A. O'Brien
and Harvey B. Jacobson
Attorneys

United States Patent Office 2,777,667
Patented Jan. 15, 1957

2,777,667

PORTABLE TRUCK DUMP

Walter L. Stafford, Moyock, N. C., and Eugene T. White, Jr., Northwest, Va.

Application April 8, 1954, Serial No. 421,793

2 Claims. (Cl. 254—4)

This invention relates in general to improvements in lifting mechanisms, and more specifically to a lift for the front end of a truck so as to facilitate the dumping of the truck.

While it is well known to provide trucks with bodies which are dumpable, in many instances it is desired to dump trucks having bodies rigidly attached thereto. This is particularly true in certain phases of farming where a farmer utilizes a conventional body truck for numerous uses about the farm and at the same time carries certain commodities to the market in such truck. When loose grains, beans or the like are carried to a storage elevator, in order that the truck carrying the grains or beans may be quickly emptied, the front end thereof is elevated so that the grains or beans will gravitate and flow out of the back end thereof.

It is, therefore, the primary object of this invention to provide a truck dump which is so constructed that it may be quickly and conveniently positioned relative to the front axle of said truck and engaged with said front axle to lift the truck the desired distance so that the load carried thereby will flow out of the back thereof.

Another object of this invention is to provide an improved truck dump which is in the form of a relatively simple hoist, the hoist including lifting arms engageable with a front axle of a truck and being provided with driving means for moving the lifting arms to elevate the front end of the truck.

A further object of this invention is to provide a novel truck dump which is designed so that it may be quickly and easily formed of readily obtainable material so as to be of such a nature that the manufacture thereof is economically feasible.

Figure 1:
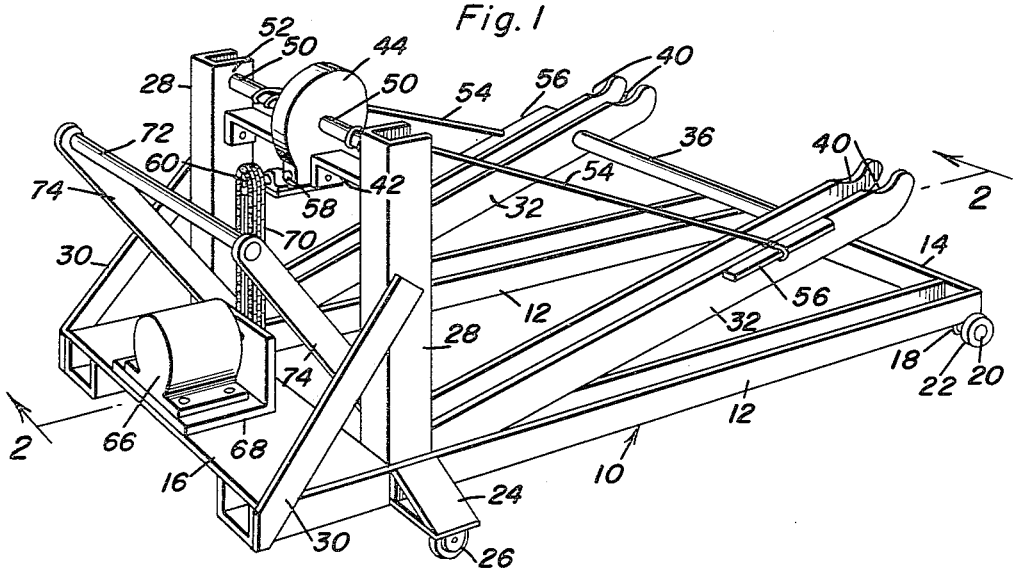
Figure 2:
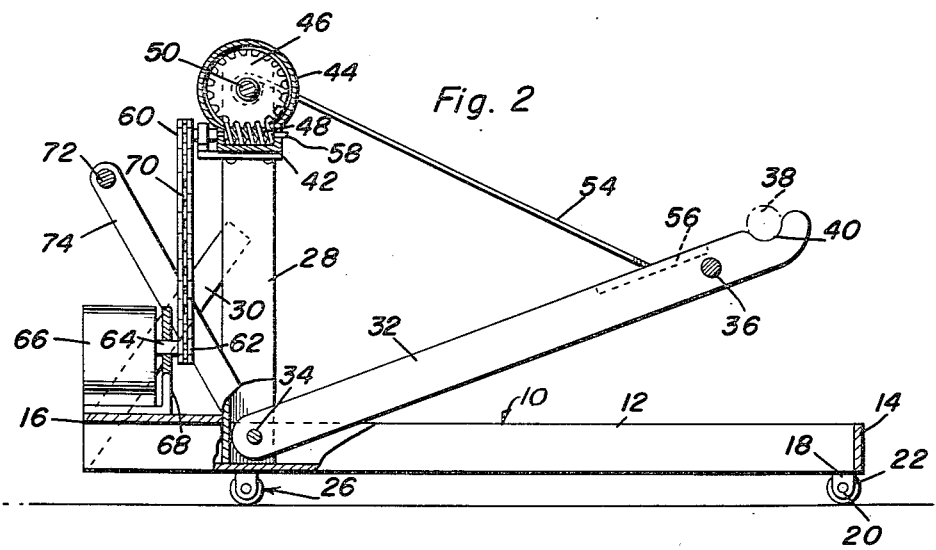

These together with other objects and advantages which will become subsequently apparent reside in the details of construction and operation as more fully hereinafter described and claimed, reference being had to the accompanying drawings forming part hereof, wherein like numerals refer to like parts throughout, and in which:

Figure 1 is a rear perspective view of the truck dump which is the subject of this invention and shows the general details thereof; and Figure 2 is a longitudinal vertical sectional view taken substantially upon the plane indicated by the section line 2—2 of Figure 1, the relative position of a front axle of a truck being shown by dotted lines.

Referring now to the drawings in detail, it will be seen that the truck dump which is the subject of this invention includes a generally rectangular frame which is referred to in general by the reference numeral 10. The frame 10 includes a pair of longitudinally extending frame rails 12. The frame rails 12 are identical and are channel-shaped in cross-section. It will be noted that the frame rails 12 are so positioned so that the channels open upwardly. The forward ends of the frame rails 12 are rigidly connected and suitably closed by a vertically disposed front transverse frame member 14. The rear ends of the frame rails 12 are rigidly connected together by a rear plate or platform 16 which extends transversely of said frame rails 12 in overlying relation.

In order that the frame 10 may be portable, each of the frame rails 12 is provided at its forward outer corner with a depending ear 18 which has secured thereto an axle 20. Mounted on the axle 20 is a wheel 22.

Secured to each frame rail 12 adjacent its rear end is an outwardly projecting wheel mount or bracket 24. The wheel mount 24 is formed of plates suitably secured together in triangular arrangement. Secured to a lowermost plate of the rear mount 24 is a caster assembly 26.

Carried by each of the frame rails 12 in transverse alignment with the wheel mounting brackets 24 is a standard 28. The standard 28 is seated in its respective frame rail 12 and rigidly secured thereto. Like the frame rails 12, the standards 28 are channel-shaped in cross-section. The standards 28 open forwardly as is best illustrated in Figure 1. The standards 28 are braced relative to their respective frame rails 12 by downwardly and rearwardly extending diagonal braces 30.

Pivotally carried by each of the standards 28 is a forwardly extending lift arm 32. Each lift arm 32 is of a channel-shape cross-section and has its rear portion seated within its respective standard 28. Each lift arm 32 is pivotally connected to its respective standard 28 by a horizontal pivot pin 34. In order to insure simultaneous movement of the two lift arms 32, the forward portions thereof are connected together by a transverse bar 36. It will be noted that the lift arms 32 are so positioned and are of such a size whereby they will partially retract within the frame rails 12.

In order that the lift arms 32 may securely engage a front axle (not shown) of a truck, such as the front axle 38 shown in dotted lines in Figure 2, the upper edges of the forward parts of the lift arms 32 are provided with notches 40 for the reception of a truck axle.

Extending transversely between the upper portions of the standards 28 is a transversely extending support 42. The support 42 has carried thereby a housing 44. Mounted within the housing 44 for rotation is a gear wheel 46. Also carried by the housing for rotation is a worm 48 which is in engagement with the gear wheel 46.

Extending through the housing 44 is a pair of shafts 50. The shafts 50 are in transverse alignment and are suitably journaled within their respective standards 28 as at 52. The inner ends of the shafts 50 are suitably secured to the gear wheel 46. If desired, the shafts 50 may be a single continuous shaft which passes through the gear wheel 46.

Entrained about the shafts 50 and having one end terminally secured thereto are flexible connectors 54. The opposite ends of the flexible connectors 54 are connected to plates 56 carried by the individual lift arms 32. The plates 56 are disposed along the outer edges of the lift arms 32.

In order that the worm 48 may be conveniently driven, it is mounted on a shaft 58 which projects rearwardly from the housing 44. Carried by the rear end of the shaft 58 is a sprocket 60 which is in vertical alignment with the sprocket 62. The sprocket 62 is mounted on a drive shaft 64 of a suitable power unit 66. The power unit 66 is carried by an L-shaped mounting bracket 68 which is, in turn, suitably carried by the plate 16. The sprockets 60 and 62 are connected by a drive chain 70 entrained thereover. If desired, the power unit 66 may be provided with built-in reduction gears (not shown).

It is to be understood that the housing 44, the gear wheel 46, the worm 48 and the shafts 50 constitute a winch.

In order that the truck dump may be easily positioned, there is provided a transverse handle 72 disposed at the rear of the frame 10. The handle 72 is connected to the standards 28 by upwardly and rearwardly extending support arms 74.

In operation, after a truck to be dumped is properly positioned with respect to an elevator or other dumping place, the truck dump is then wheeled towards the front of the truck and is so positioned whereby the lift arms 32 will engage the front axle of the truck in the notches 40. Once the lift arms 32 are properly positioned, the power unit 66 is energized to operate the winch so that the shafts 50 will rotate and reel the flexible connectors 54 thereon. This will cause the elevating of the front ends of the lift arms 32 with the resulting lifting of the front end of an associated truck in the dumping of the load thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A truck dump which is portable and adapted to hoist the forward end of a truck in a manner to incline the truck body and facilitate dumping a load from the body by way of the usual tail gate at the rear end thereof comprising, in combination, a low-lying mobile horizontal frame embodying a pair of spaced parallel frame members channel-shaped in cross-section and with their channels opening upwardly, a horizontal plate overlying and rigidly fastened to corresponding end portions of said frame members and providing a platform, a pair of vertical channel-shaped standards having their lower ends telescoping into the channels of said frame members and abutting an adjacent longitudinal edge portion of said platform, horizontal support means fixed to the upper end portions of the respective standards and partially bridging the space between said standards, a gear housing supported by said support means and having a gear wheel mounted for rotation therein, said gear wheel being provided with complemental axially aligned shafts with their outer ends supported between the upper end portions of said standards, a prime mover mounted on said platform, an operating connection between said prime mover and gear wheel, a pair of lift arms mounted for operation directly above and in alignment with the channels of said frame members and having portions foldable into said channels, ends of said lift arms extending into the lower channel portions of the respective standards, means pivotally connecting said ends to said standards, and flexible connectors having corresponding ends wound for operation around their respective shafts and their opposite ends operatively connected with their respective lift arms.

2. The structure defined in claim 1 and wherein said prime mover is an electric motor supported on said platform and operatively connected with said gear wheel, and the combination therewith of rearwardly and upwardly inclined support arms secured at their lower ends with the respective standards, and a handle mounted fixedly between the upper ends of said support arms.

References Cited in the file of this patent

UNITED STATES PATENTS

| | | |
|---|---|---|
| 602,259 | Jandro | Apr. 12, 1898 |
| 694,248 | Buck | Feb. 25, 1902 |
| 756,454 | Astrup | Apr. 5, 1904 |
| 1,216,157 | Mortimer | Feb. 13, 1917 |
| 1,306,430 | Klemme | June 10, 1919 |
| 1,684,606 | Thielen | Sept. 18, 1928 |
| 2,397,507 | Roberts | Apr. 2, 1946 |